(12) United States Patent
Messersmith

(10) Patent No.: US 6,428,117 B1
(45) Date of Patent: Aug. 6, 2002

(54) PARKING BRAKE CONTROL

(75) Inventor: William Kent Messersmith, Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 21 days.

(21) Appl. No.: 09/795,563

(22) Filed: Mar. 1, 2001

(51) Int. Cl.$^7$ .......................... B60T 13/74; B60T 11/10
(52) U.S. Cl. ............................... 303/3; 303/15; 303/20; 188/151 A; 188/170; 192/219.4
(58) Field of Search .................... 303/3, 15, 20; 188/170, 151 A; 192/219.4

(56) References Cited

U.S. PATENT DOCUMENTS

| | | | | |
|---|---|---|---|---|
| 3,093,213 A | * | 6/1963 | Limoges et al. | 188/106 P |
| 3,802,745 A | * | 4/1974 | Strifler et al. | 303/115.4 |
| 5,310,251 A | * | 5/1994 | Towers et al. | 188/151 A |
| 5,370,449 A | * | 12/1994 | Edelen et al. | 188/151 A |
| 5,630,489 A | * | 5/1997 | Bebernes | 192/219.4 |
| 5,984,424 A | * | 11/1999 | Jin | 188/151 A |
| 5,984,425 A | * | 11/1999 | Orzal | 303/3 |
| 6,019,436 A | * | 2/2000 | Siepker | 188/106 F |
| 6,209,689 B1 | * | 4/2001 | Bohm | 188/1.11 E |
| 6,293,363 B1 | * | 9/2001 | Rangaswamy et al. | 180/287 |

* cited by examiner

*Primary Examiner*—Jack Lavinder
*Assistant Examiner*—Robert A Siconolfi
(74) *Attorney, Agent, or Firm*—Leo H McCormick, Jr.; Warren Comstock

(57) ABSTRACT

A parking brake system (10) for a vehicle. The control system (10) includes solenoid valve (30) which controls communicating of pressurized fluid from an inlet port (32) to the actuator assembly (12) of a drum brake and from the actuator assembly (12) to a reservoir (41). Solenoid valve (30) has a coil (50) consisting of a first circuit (52) and a second circuit (54). In response to an operator activating a parking brake switch (80) and after signals corresponding to the operational condition of the vehicle are evaluated by an electronic control unit (100) current may directly flow in the first circuit (52) from a battery (200) to the solenoid valve (30) and may flow in a second circuit (54) after the closure of an ignition switch (201). If the electronic control unit (100) determines the actuator assembly (12) can safely be released, current is allowed to flow in the first (52) and second (54) circuits to develop independent first and second magnetic forces which jointly act on and move a plunger (28) from a first position where the actuator assembly (12) is connected to the reservoir (41) to a second position where pressurized fluid is communicated to the actuator assembly (12). With the actuator assembly (12) connected to the reservoir (41), a spring (20) acts on a piston (21) to provide a force which moves friction pads into engagement with a drum (15) and effect a parking brake application and with pressurized fluid being presented to the actuator assembly (12) the pressurized fluid acts on the piston (21) acts and after overcoming the spring (20) provides a force to move the friction pads away from the drum (15) to terminate the brake application. The first and second magnetic forces are insufficient to independently to move the plunger (28) from the first position to the second position but sufficient to hold the plunger (28) in the second position to assure that the plunger (28) does move to the first position and create an unwanted parking brake application in response to a termination of the development of either the first or second magnetic force.

11 Claims, 2 Drawing Sheets

PARKING BRAKE CONTROL

This invention relates to a control system for a parking brake which inhibits the actuation of a solenoid valve caused by intermittent changes in current supplied to the solenoid valve resulting from the operation of a vehicle to prevent the release of pressurized fluid which holds a parking brake in a released position.

BACKGROUND OF THE INVENTION

Parking brake systems having a spring apply and a hydraulic or air release are known as illustrated by the structure disclosed in the following U.S. Pat. Nos.: 3,802,745; 3,827,758; 4,861,115; 5,310,251; 5,370,449. In such parking brake systems, a solenoid valve is usually connected in series with a parking brake control and a transmission control console. The parking brake system is activated by pushing or pulling a plunger control which is normally located on a dash of the vehicle. When the selector for transmission of the vehicle is moved to a "park" position, the transmission is actually in a neutral condition while the parking brake may be in either the applied or un-applied position. The parking brake is applied by a spring which acts through a linkage to provide a mechanical force that moves friction linings into engagement with a drum or disc brake to effect a parking brake application. In order to release the parking brake, a solenoid valve is actuated to allow pressurized fluid to be communicated to an actuator which acts on a diaphragm or piston associated with the linkage. The hydraulic force developed by the pressurized fluid acts on piston to compresses the spring and thereafter move the friction linings away from the drum or disc brake. With the spring un-applied, the wheels of the vehicle can now roll and the vehicle driven.

A problem for such a system is that an unexpected loss of electrical power in a general electrical system may create a hazardous situation through an inadvertent actuation of the parking brake. This problem was partially recognized in U.S. Pat. No. 5,370,449 where a parking brake control system was disclosed which prevents the actuation of the parking brake during certain conditions. In this system an electronic control unit provides a input to momentary energize a first solenoid to a desired position where pressurized fluid is released from an actuator to allow a spring to mechanically move a brake to a brake apply position. The first solenoid is maintained in the brake apply position by a mechanical detent after de-energization by the electronic control unit. The electronic control unit receives inputs, such as engine speed, ground speed, transmission gear selection and parking gear selection, relating to the operation of the vehicle and only if certain conditions are present supplies a second solenoid with an input to allow pressurized fluid to be supplied to an actuator which acts on the spring and allow the parking brake to be released. While this structure does prevent the release of a parking brake of a vehicle from a parked position, it does not address actuation of a parking brake through a loss of power once the vehicle has been in motion.

SUMMARY OF THE INVENTION

It is an object of the present invention to provide a control system for a parking brake with a redundantly actuated solenoid valve whereby the release of the parking brake from an actuation position is achieved by movement of a plunger through a combined magnetic force developed by first and second coils of the solenoid valve to allow pressurized fluid to overcome a spring while a magnetic force developed in either the first and second coils is sufficient to maintain the plunger in the released position.

In more particular detail, the control system for a parking brake includes an actuator assembly which is responsive to a resilient member for moving the parking brake into a brake apply position and to a hydraulic arrangement for moving the parking brake into a brake release position. The hydraulic arrangement including a housing with a bore therein for retaining a plunger of a solenoid valve. The bore has an inlet port connected to a source of pressurized fluid, an outlet port connected to the actuator assembly and a reservoir or relief port connected to a reservoir. The plunger has a first position in the bore whereby the outlet port is connected with the relief port to permit communication of pressurized fluid from the actuator assembly when it is desired that the parking brake be in a brake apply position. The plunger has a second position in the bore whereby the inlet port is connected to the outlet port to communicate pressurized fluid from a supply source to the actuator assembly. The pressurized fluid, after overcome the resilient member, moves the parking brake to a release position. A coil of the solenoid valve is connected to receiving electrical current from an electrical source (battery) on activation of a parking brake switch. The flow of electrical current in the coil develops a magnetic force which acts on and moves the plunger from the first position to the second position. The solenoid valve is characterized by the coil having a first circuit which directly receives a first current from the electrical source in response to the actuation of the parking brake switch and a second circuit which receives a second current from the electrical source by way of an ignition switch in response to the actuation of the parking brake switch. The second current can be effected by variation caused by changes in the operational conditions of the vehicle and as a result a first magnetic force developed in first circuit may differ from a second magnetic force developed in the second circuit of the coil. However, the first magnetic force and the second magnetic force are combined and jointly move the plunger from the first position to the second position. Thereafter, either the first or second magnetic force is sufficient to independently hold and maintain the plunger in the second position. Thus, after a vehicle is moving and even if either the first or second magnetic forces do not develop in the coil, a remaining magnetic force is sufficient to hold the plunger from moving to the first position which would allow pressurized fluid to be released from the actuator and allow the resilient member to apply the parking brake.

An advantage of this control system resides in a independent and redundant actuation of first and second circuits to develop first and second magnetic forces in a coil of a solenoid valve to move a plunger which controls the communication of pressurization to an actuator for releasing a spring applied parking brake with either the first or second magnetic force being sufficient to prevent an inadvertent actuation of the parking brake.

An object of this invention is to provide a control system with first and second electrical circuits wherein electrical current is communicated to a coil in a solenoid valve for developing first and second magnetic forces which jointly act on and move a plunger to allow pressurized fluid which acts on and moves a resilient member to release a parking brake and either of the first and second magnetic forces is sufficient to maintain and hold the plunger in this position to assure that the parking brake remains in the released position.

A further object of this invention is to provide a parking brake control system with a solenoid valve activated by combined first and second magnetic forces developed in a coil which move a plunger to a applied position to allow pressurized fluid to be presented to a parking brake to overcome a spring force and release the parking brake from an applied position, with either of the first or second magnetic force being sufficient to maintained the plunger in the applied position should a failure occur in a development of the other magnetic force which would allow the plunger to move to the applied position until the vehicle is brought to a stop where a spring applied force effects a parking brake application but being insufficient to move the plunger once the vehicle is stopped and thereafter the release the spring applied force until the failure is corrected.

DETAILED DESCRIPTION

Figure 1:
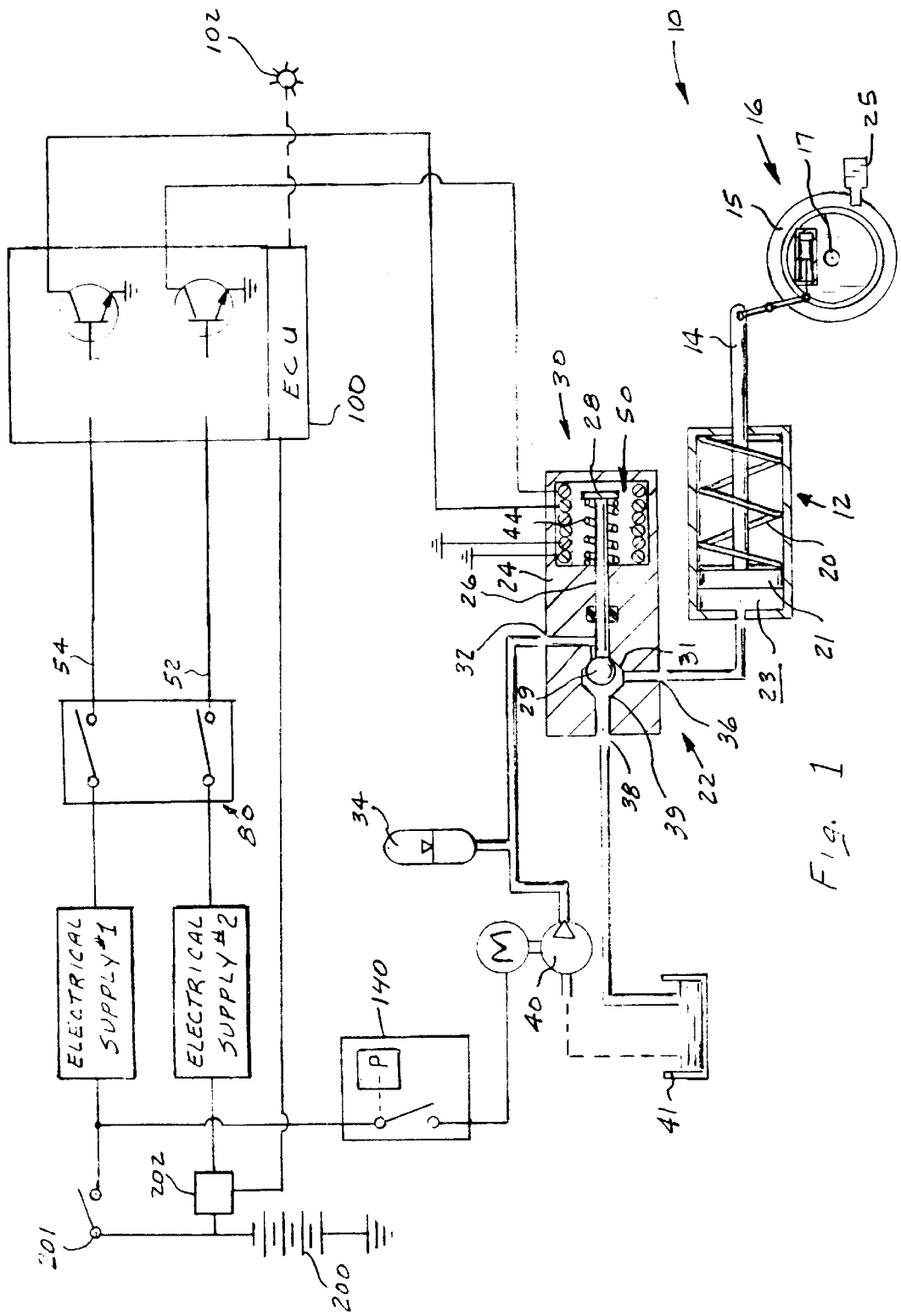
FIG. 1 is a schematic diagram of a control system for a parking brake in a vehicle made according to the principals of this invention in an actuated position.

The brake system 10 of the present invention is designed to provide a parking brake for a vehicle which is independent of the service brakes of the vehicle. The brake system 10 includes an actuator assembly 12 connected by linkage 14 to a parking brake 16 associated with a drum 15 secured to shaft 17 of the drive train of the vehicle.

The actuator assembly 12, which is of a type disclosed in U.S. Pat. No. 5,704,693, has a spring 20 which acts on a piston 21 to supply a force through linkage 14 to move a friction members into engagement with drum 15 to mechanically effect an application of the parking brake 16 of the vehicle. The parking brake 16 is designed to remain in an applied position until released through the actuation of a hydraulic arrangement 22 by a parking brake switch 80. The parking brake switch 80 which is of a double pole single throw construction, is normally located on a dash panel of the vehicle and activated by an operator either pushing or pulling on a knob. However, if an operator activates the parking brake switch 80, an electronic control unit 100 may override the actuation of the hydraulic arrangement if various operating inputs and/or conditions are not present which could effect the safe operation the vehicle including but not limited to the following: ground speed, engine speed, a parking brake switch, the position of the transmission gear selector, the availability of hydraulic fluid pressure, operator input; electric current; and etc.

In more detail, the hydraulic arrangement 22 includes a housing 24 with a bore 26 therein for retaining a plunger 28 of a solenoid valve 30. Bore 26 has an inlet port 32 connected to a source of pressurized fluid available in an accumulator 34 associated with the service brakes of the vehicle, an outlet port 36 connected to the actuator assembly 12 for parking brake 16 and a relief port 38 connected to reservoir 41 for a motor driven pump 40 in the service brake system of the vehicle. A coil 50, retained in housing 24 and surrounding plunger 28, is connected to receive electrical current from a source (battery 200) in response to the closure of parking brake switch 80. The solenoid valve 30 has a spring 44 which acts on plunger 28 to define a first position for the plunger 28 in bore 26.

In the first position for plunger 28, outlet port 36 is connected with relief port 38. With plunger 28 in the first position, any pressurized fluid in a chamber 23 associated with piston 21 in actuator assembly 12 is freely communicated to reservoir 41. With the fluid pressure in chamber 23 at the same fluid pressure (atmospheric pressure) of reservoir 41, resilient member 20 applies a force to mechanically move friction linings of the parking brake 16 into engagement with drum 15 to create a parking brake apply situation.

Plunger 28 has a second position which is established by movement of plunger 28 in bore 26 in response to the development of a magnetic force in coil 50 on actuation of parking brake switch 80 to a release position by an operator. With the plunger 28 in the second position, inlet port 32 is connected to outlet port 36 and pressurized fluid from accumulator 34 is supplied to chamber 23 in the actuator assembly 12. This pressurized fluid acts on piston 21 and after overcoming spring 20, provides a hydraulic force to move the friction linings out of engagement with the drum 15 and release the parking brake 16 to thereafter permit shaft 17 of the drive train to rotate and correspondingly the wheel to roll and allow movement of the vehicle.

In still more particular detail, the coil 50 has a first winding or circuit 52 which directly receives a first current from an electrical source (battery 200 via relay 202) and parking brake switch 80 and a second winding or circuit 54 which receives a second current from the electrical source (battery 200 as modified or directed through ignition switch 201) on actuation of the ignition switch 201 and parking brake switch 80. The first and second currents, even though either are susceptible to variation or fluctuation caused by changes in the operational conditions of the vehicle, are separate, distinct and respectively flow in the first 52 and second 54 winding circuits to create independent first and second magnetic forces in coil 50. The first magnetic force and the second magnetic force are combined to concurrently move plunger 28 from the first position to the second position. The first 52 and second 54 winding circuits in a first embodiment are selected such that either of the first magnetic force and/or the second magnetic force is sufficient to independently move and hold plunger 28 in second position in an absence of the other while in a second embodiment the first and second magnetic forces must be combined to move the plunger 28 from the first position to the second position but either will independently hold and maintain the plunger 28 in the second position.

Mode of Operation

As shown in FIG. 1, it is assumed that a vehicle is parked and the engine of the vehicle is not running. When the engine is parked, resilient member (spring) 20 of actuator assembly 12 acts through linkage 14 to provide parking brake 16 with a mechanical force to move friction linings into engagement with drum 15 and hold shaft 17 of the drive train in a stationary or non-rotative position to thereby effect a parking brake application of the wheels of the vehicle. The parking brake 16 remains in this spring apply condition until several independent steps are performed by an operator and/or the electronic control unit 100 to determine if it is safe to move the vehicle.

In order to move the vehicle, an operator would first turn the ignition switch 201 to a run position such that electrical current from battery 200 is supplied to various sensors and the electronic control unit 100 in the vehicle. One of the first safety features checked by the electronic control unit 100 is to determine the availability of pressurized fluid in the service brake system as sensed by the fluid pressure in accumulator 34. The pressure of the pressurized fluid in accumulator 34 is controlled by pressure switch 140 and if this pressure is below a predetermined level an actuation signal is sent operate a motor pump 40 and build pressure for fluid supplied to accumulator 34 until a predetermined level is achieve for operating the service brake system. This safety check is automatic and until the desired fluid pressure level is met, the brake system 10 is prevented from responding to an operator input requesting a release of the friction linings from drum 15 as the electronic control unit 100 over rides an input for release as applied to the parking brake switch 80. Once the fluid pressure of the fluid in accumulator 34 reaches the predetermined level, a pressure signal is sent to the electronic control unit 100 indicating the availability of pressurized fluid in the service brake system.

Figure 2:
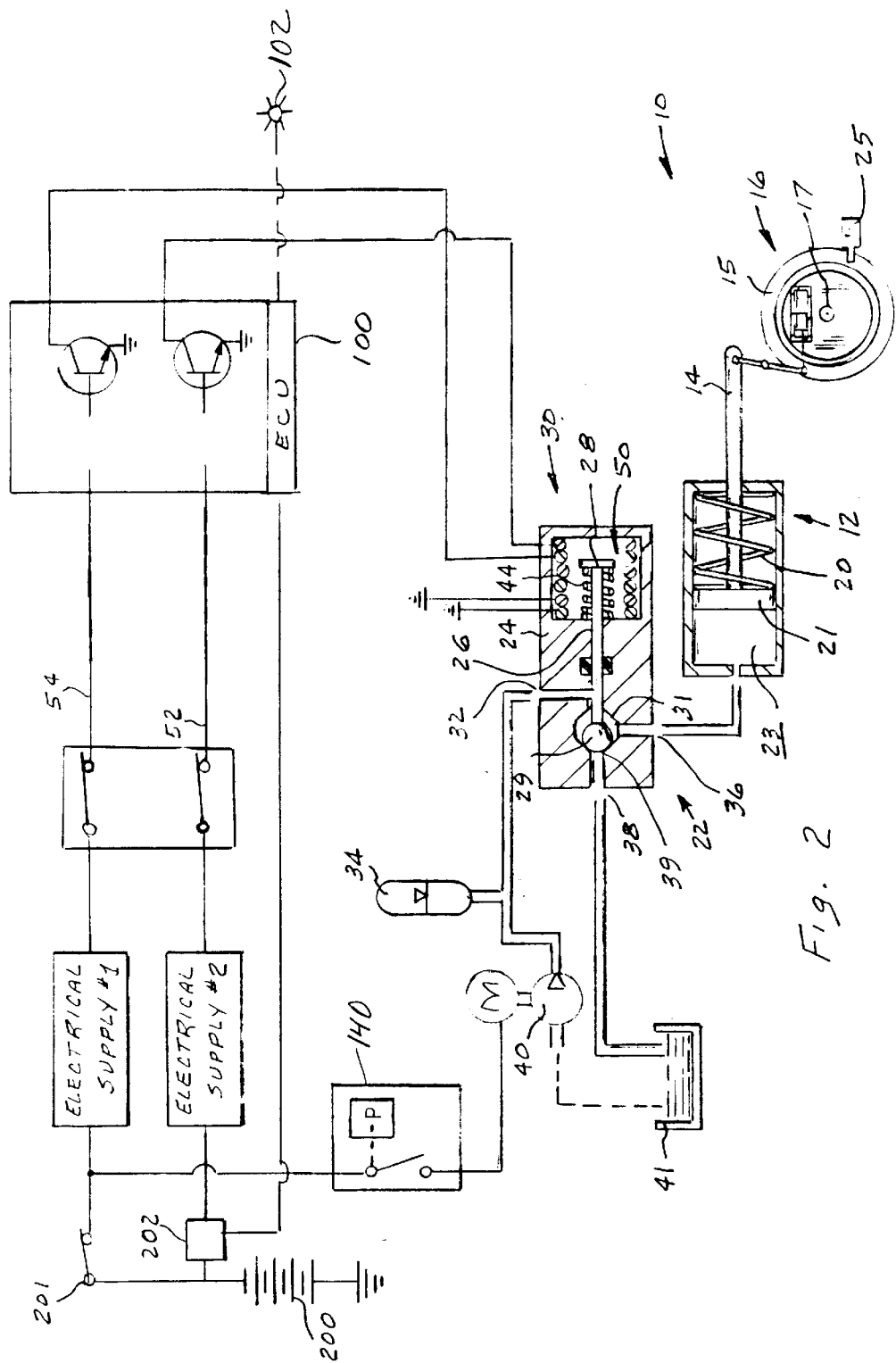
FIG. 2 is a schematic diagram of the control system of FIG. 1 with the parking brake in a release position.

With the engine operating but before the transmission is shifted into gear and movement of the vehicle occurs, an operator must provide a dash parking brake switch 80 with an input indicating a desired to have the actuator assembly 12 shifted from the spring applied operation. The electronic control unit 100 evaluates the operator's desire to release the parking brake 16 and along with other inputs (i.e. fluid pressure in accumulator 34) prevents the release of the parking brake 16 until the sensed parameters associated with the vehicle indicate it is safe to operate the vehicle. If the electronic control unit 100 determines it is safe to operate the vehicle, a signal is sent to relay 202 to allow current to directly flow from battery 200 in the first winding circuit 52 to coil 50 and to flow from battery 200 through switch 201 in the second winding circuit 54 to coil 50. The current flow in the first winding circuit 52 creates a first magnetic force in solenoid valve 30 and the current flow in the second circuit 54 creates a second magnetic force in the solenoid valve 30. The first and second magnetic forces are combined and act on plunger 28 and after overcoming the force of spring 44 move face 29 away from a seat 31 and into engagement with seat 39 to terminate communication between exit port 36 and relief port 38 while initiating communication between inlet port 32 and exit port 36 to communicate pressurized fluid from accumulator 34 and chamber 23 of actuator assembly 12 as illustrated in FIG. 2. The pressurized fluid in chamber 23 acts on piston 21, and after overcoming spring 20, moves piston 21 to provide a force through linkage 14 to move the friction linings away from drum 15 of the parking brake 16. A sensor 25 associated with parking brake 16 provides a signal to the electronic control unit 100 to indicate that the friction linings have been disengaged from drum 15, i.e. the parking brake 16 has shifted from the spring applied to a hydraulic released position. When the friction linings are moved away from drum 15, shaft 17 can now freely rotated and the wheels of the vehicle roll to allow for movement of the vehicle. In some vehicle, only after receiving this released signal will the electronic control unit 100 allow the transmission to be shifted from neutral into a desired gear to provide torque through shaft 17 of the drive train to rotate the wheels and move the vehicle.

The current supplied to the first winding circuit 52 comes directly from the battery 200 and is essentially constant while the current supplied to the second winding circuit 54 comes from battery 200 by way of the ignition switch 201 and while normally substantially constant may change as a result of a combination of operational demands of various components in the vehicle. The first 52 and second 54 winding circuits are normally selected such that either the resulting first magnetic force and/or the second magnetic force is sufficient to move plunger 28 from the first position to the second position and independently hold plunger 28 in second position in a complete absence of or a change in the other magnetic force. Thus, should a total failure occur in either the first 52 or second 54 winding circuits, i.e. broken wire, the brake system 10 can continue to operate as the remaining magnetic force is sufficient to hold and maintain plunger 28 in the second position to prevent an inadvertent actuation of the parking brake 16.

The electronic control unit 100 monitors the operation of the solenoid valve 30 and should a failure occur in either the first 52 or second 54 winding circuits, a failure warning indicator 102 is activated to alert an operator with a signal to indicate an absence of current flow and precaution should be observed in the continued operation of the vehicle. After such alert and an operator has brought the vehicle to a stop through the service brakes, depending on inputs relating to the operational condition of the vehicle (i.e. ground speed, engine speed, fluid pressure in accumulator, battery current, electrical failure and etc.) have been supplied to the electronic control unit 100, the actuator assembly 12 of parking brake system 10 will shift to the spring (20) applied operation. However, once a single circuit has been engaged to operate and hold the plunger 28, the electronic control unit 100 will over-ride a release even though the parking brake switch 80 is moved to a release position to inhibit the communication of current in the remaining circuit until a failure condition is corrected.

When the electronic control unit 100 determines an emergency exist and the vehicle is brought to a stop, the electronic control unit 100 terminate the flow of current to the functioning circuit of the first 52 and second 54 winding circuits. Once the magnetic force acting on plunger 28 ceases, spring 44 sequentially moves face 29 away from seat 39 into engagement with seat 31 to terminate communication of pressurized fluid from accumulator 34 to chamber 23 and opens communication between exit port 36 and relief port 38 such that pressurized fluid in chamber 23 is now communicated to reservoir 41. Thereafter, spring 20 acts through linkage 14 and mechanically moves friction lining into engagement with drum 15 to effect an emergency brake application. Once the vehicle has come to a stop and a spring applied parking brake situation has been achieved, the parking brake system 10 remains in the spring applied situation as illustrated in FIG. 1 until the cause of the failure is corrected.

Under some conditions, it may be desirable to select the strength of the first and second winding circuits such that with a total failure of one of the winding circuits, the solenoid valve 30 could be activated by an emergency input in order to move a vehicle by towing or with emergency blinkers activated. This emergency input would by-pass the activation of solenoid valve 30 by inputs from parking brake switch 80 and electronic control unit 100 such that current could be directed to the functioning winding circuit associated with coil 50 and a single magnetic force would be developed which is sufficient to move face 29 on the plunger 28 away seat 31 and into engagement with seat 39. With face 29 in engagement with seat 31, pressurized fluid could be communicated to chamber 23 in actuator assembly 12 by way of inlet port 32. This pressurized fluid after overcoming spring 20 would move piston 21 and provide a force to move friction linings away from drum 15 to release the parking brake 16. Once the parking brake is released, the drive train is free to rotate and the wheels of the vehicle could roll and allow the vehicle to be towed to a place of repair.

I claim:

1. A control system for an actuator assembly of a parking brake for a vehicle, the actuator assembly being moved into a brake apply position by resilient means and being moved into a brake release position by hydraulic means, said hydraulic means having a solenoid valve with a housing, said housing having a bore therein with an inlet port connected to a source of pressurized fluid, an outlet port connected to said actuator assembly and a relief port connected to a reservoir, said solenoid valve having a plunger located in said bore and coil means associated with said plunger, said coil means being connected to a source of electrical current, and an electronic control unit responsive to operational parameters of the vehicle and an operator input to control the communication of electrical current to said coil means for developing a magnetic force to move said plunger from a first position where said actuator assembly is connected to said reservoir by way of said outlet port and relief port and in the brake apply position to a second position where pressurized fluid is supplied to said actuator assembly by way of said inlet port and outlet port to the brake release position, said solenoid valve being characterized by said coil means having a first circuit connected to directly receive a first current from an electrical source and a second circuit connected to receive a second current from said electrical source through an ignition switch, said second current being subjected to changes as a function of the operational characteristics of the vehicle, and by a parking brake switch responsive to a signal for concurrently allowing current to flow in said first and second circuits and developing first and second magnetic forces in said coil means sufficient to jointly move said plunger to said second position where pressurize fluid is communicated to move said actuator assembly to said brake release position, said first magnetic force and said second magnetic force being insufficient to independently move said plunger from said first position to said second position but sufficient to maintain said plunger in said second position once said plunger is located in said second position to assure that said pressurized fluid is not released from said actuator assembly with an interruption of current flow in said first or second circuits.

2. The control system as recited in claim 1 wherein said first and second magnetic forces while jointly required to move said plunger from the first position to the second position and either said first or second magnetic force is sufficient to hold and maintain said plunger in said second position with a failure in a desired development of a magnetic force in the other but is insufficient to move the plunger from the first position to the second position once a single magnetic force is employed to hold the plunger in the second position.

3. The control system as recited in claim 2 wherein said coil means includes monitor means for providing a visual indication of said single magnetic force being utilized to hold the plunger in the second position.

4. A control system for an actuator assembly of a parking brake in a vehicle, said actuator assembly being responsive to resilient means for moving the parking brake into a brake apply position: and being responsive to hydraulic means for moving the parking brake into a brake release position, said hydraulic means having a housing with a bore therein for retaining a solenoid valve, said bore having an inlet port connected to a source of pressurized fluid, an outlet port connected to said actuator assembly and a relief port connected to a reservoir, said solenoid valve having a plunger located in a first position in said bore for connecting said outlet port with said relief port to communicate pressurized fluid from said actuator assembly when said parking brake is in said brake apply position and in a second position for connecting said inlet port and said outlet port to supply pressurized fluid to the actuator assembly when said parking brake is in said release position, coil means for moving said plunger between said first and second positions, said coil means being connected to receive electrical current from a source, and an electronic control unit responsive to operational parameters of the vehicle and an operator input for either directing electrical current to said coil means for the development of a magnetic force to move said plunger from said first position to said second position, said solenoid valve being characterized by said coil means having a first circuit connected to directly receive a first current from an electrical source and a second circuit connected to receive a second current from said electrical source through an ignition switch, said first and second currents being subjected to changes corresponding to operational characteristics experienced by the vehicle; and by a parking brake switch which on actuation initiates the concurrent flow of current in said first and second circuits to correspondingly develop a first magnetic force and a second magnetic force in said coil means, said first magnetic force and said second magnetic force being combined to jointly moving said plunger from said first position to said second position, said first and second magnetic forces being insufficient to independently move said plunger but sufficient to hold and maintain said plunger in said second position without regard to changes in said first and second magnetic forces.

5. The control system in claim 4 wherein said electronic control unit provides a relay with an input signal to initiate current flow in said first circuit while current flow in said second circuit requires actuation of said parking brake switch.

6. The control system as recited in claim 5 wherein said coil means further includes monitor means to provide an operator with a signal of insufficient current flow in at least one of said first and second circuits required to develop a desired magnetic force to move said plunger.

7. The control system as recited in claim 6 wherein said first current flow in said first circuit is regulated by an input from said ignition switch.

8. A control system for a parking brake of a vehicle, said control system including an actuator assembly with resilient means for moving the parking brake into a brake apply position and hydraulic means for moving the parking brake into a brake release position, said hydraulic means including a housing with a bore therein for retaining a solenoid valve, said bore having an inlet port connected to a source of pressurized fluid, an outlet port connected to said actuator assembly and a relief port connected to a reservoir, said solenoid valve having a plunger located in a first position in said bore for connecting said outlet port with said relief port to communicate pressurized fluid from said actuator assembly when said parking brake is in a brake apply position and in a second position for connecting said inlet port and said outlet port to supply pressurized fluid to the actuator assembly when said parking brake is in a release position, coil means in said solenoid valve and connected to receive electrical current from a source, and an electronic control unit responsive to operational parameters of the vehicle including an operator input for actuating a parking brake switch and allowing electrical current to flow to said coil means for developing a magnetic force that acts on and moves said plunger from said first position to said second position, said solenoid valve being characterized by said coil means having a first circuit which directly receives a first current from an electrical source and a second circuit which receives a second current from said electrical source by way of an ignition switch on actuation of said parking brake switch, said first and second currents being susceptible to variations caused by changes in the operational conditions of the vehicle, said first and second currents on flowing in said first and second circuits respectively developing a first magnetic force and a second magnetic force in said coil means, said first magnetic force and said second magnetic force being combined and jointly moving said plunger from said first position to said second position with either of said first and second magnetic forces being sufficient to independently hold said plunger in said second position.

9. The control system as recited in claim 8 wherein said coil means further includes monitor means to provide an operator with a signal indicating an absence of current flow in either of said first or second circuits.

10. The control system as recited in claim 9 wherein said first current flow in said first circuit is regulated by an input from said electronic control unit and said second current flow in said second circuit is received from said ignition switch.

11. The control system as recited in claim 10 wherein an input from said electronic control unit to said first circuit is directed to a relay which allows current to directly flow from a battery to the coil by way of the electronic control unit.

\* \* \* \* \*